United States Patent [19]
Valentine et al.

[11] Patent Number: 6,044,070
[45] Date of Patent: Mar. 28, 2000

[54] REMOTE CONNECTION CONTROL USING A TUNNELING PROTOCOL

[75] Inventors: Eric Valentine, Plano, Tex.; Michael Coyne, Stockholm, Sweden

[73] Assignee: Ericsson Inc., Research Triangle Park, N.C.

[21] Appl. No.: 08/950,693

[22] Filed: Oct. 15, 1997

[51] Int. Cl.[7] .............................. H04B 7/185; H04B 7/00
[52] U.S. Cl. .......................... 370/316; 370/466; 370/522; 455/12.1
[58] Field of Search ..................................... 370/310, 316, 370/327, 328, 329, 466, 522; 455/12.1, 427, 430, 433

[56] References Cited

U.S. PATENT DOCUMENTS

| 5,388,101 | 2/1995 | Dinkins | 348/12 |
| 5,724,658 | 3/1998 | Hasan | 455/455 |
| 5,903,603 | 5/1999 | Kennedy et al. | 375/222 |

FOREIGN PATENT DOCUMENTS 0 536 921 A1  4/1993  European Pat. Off. .

WO 95/34153  12/1995  WIPO .

*Primary Examiner*—Hassan Kizou
*Assistant Examiner*—Saba Tsegaye
*Attorney, Agent, or Firm*—Jenkens & Gilchrist, P.C.

[57] ABSTRACT

A telecommunications system and method for allowing calls to and from mobile terminals to be handled directly by a remote terminal without the need for trunk lines between the remote terminal and the network. This is accomplished by tunneling the signaling messages between the remote terminal (RT) and the network (Mobile Services Center/Visitor Location Register), for example, via the Transfer Communication Protocol/Internet Protocol (TCP/IP), which is a communications link of the type used by the Internet. The remote terminal preferably consists of a traffic channel controller for allocation and release of traffic channels over the satellite, an interworking function for speech coding and for signaling via, for example, the TCP/IP, and the Public Switched Telephone Network (PSTN) interface. These main three components function together to provide cost-effective cellular coverage to remote villages.

30 Claims, 4 Drawing Sheets

REMOTE CONNECTION CONTROL USING A TUNNELING PROTOCOL

BACKGROUND OF THE PRESENT INVENTION

1. Field of the Invention

The present invention relates generally to telecommunications systems and methods for providing cost-effective cellular coverage to low traffic areas, and particularly to a system and method for tunneling signaling messages to enable a direct connection between a Mobile Terminal (MT) and a remote subscriber of a non-trunked Public Switched Telephone Network (PSTN) through a satellite communications link.

2. Background and Objects of the Present Invention

Cellular telecommunications is one of the fastest growing and most demanding telecommunications applications ever. Today it represents a large and continuously increasing percentage of all new telephone subscriptions around the world. A standardization group, Global System for Mobile Communication (GSM), was established in 1982 to formulate the specifications for mobile cellular radio systems.

With reference now to FIG. 1 of the drawings, there is illustrated a Public Land Mobile Network (PLMN), such as cellular network 10, which in turn is composed of a plurality of areas 12, each with a Mobile Services Center (MSC) 14 and an integrated Visitor Location Register (VLR) 16 therein. The MSC/VLR areas 12, in turn, include a plurality of Location Areas (LA) 18, which are defined as that part of a given MSC/VLR area 12 in which a mobile station (MS) 20 may move freely without having to send update location information to the MSC/VLR area 12 that controls the LA 18. Each Location Area 12 is divided into a number of cells 22. Mobile Station (MS) 20 is the physical equipment, e.g., a car phone or other portable phone, used by mobile subscribers to communicate with the cellular network 10, each other, and users outside the subscribed network, both wireline (PSTN) and wireless (PLMN).

The MSC 14 is in communication with at least one Base Station Controller (BSC) 23, which, in turn, is in contact with at least one Base Transceiver Station (BTS) 24. The BTS is the physical equipment, illustrated for simplicity as a radio tower, that provides radio coverage to the geographical part of the cell 22 for which it is responsible. It should be understood that the BSC 23 may be connected to several base transceiver stations 24, and may be implemented as a stand-alone node or integrated with the MSC 14. In either event, the BSC 23 and BTS 24 components, as a whole, are generally referred to as a Base Station System (BSS) 25.

With further reference to FIG. 1, the PLMN Service Area or cellular network 10 includes a Home Location Register (HLR) 26, which is a database maintaining all subscriber information, e.g., user profiles, current location information, International Mobile Subscriber Identity (IMSI) numbers, and other administrative information. The HLR 26 may be co-located with a given MSC 14, integrated with the MSC 14, or alternatively can service multiple MSCs 14, the latter of which is illustrated in FIG. 1.

The VLR 16 is a database containing information about all of the Mobile Stations 20 currently located within the MSC/VLR area 12. If a MS 20 roams into a new MSC/VLR area 12, the VLR 16 connected to that MSC 14 will request data about that Mobile Station 20 from the HLR database 26 (simultaneously informing the HLR 26 about the current location of the MS 20). Accordingly, if the user of the MS 20 then wants to make a call, the local VLR 16 will have the requisite identification information without having to reinterrogate the HLR 26. In the aforedescribed manner, the VLR and HLR databases 16 and 26, respectively, contain various subscriber information associated with a given MS 20.

In many parts of the world, although it is desirable to provide access to telecommunications services, the level of chargeable traffic density makes it difficult to justify high levels of spending on the infrastructure. For instance, considering a system which covers a number of small, sparsely populated islands, all of which have a view to a geosynchronous satellite, the per-capita costs of installation of complete switching systems could be prohibitive without subsidies. This is especially true for satellite systems based on cellular technology, since that technology, while useful in the parts of the coverage area where mobility is more of an issue and where traffic intensity is higher, tends to be "overkill" in such "remote village" types of applications.

It is therefore an object of the invention to provide a cost-effective communication path between the MS and the Public Switched Telephone Network (wireline) at these remote locations in order to allow cellular voice and data calls to be placed to and from remote locations.

SUMMARY OF THE INVENTION

The present invention is directed to telecommunications systems and methods for allowing calls to and from mobile terminals to be handled directly by a remote terminal without the need for trunk lines between the remote terminal and a network. This is accomplished by tunneling the signaling messages between the remote terminal (RT) and the network (MSC/VLR), for example, via the Transfer Communication Protocol/Internet Protocol (TCP/IP), which is a communications link of the type used by the Internet. Therefore, only signaling messages are transferred between the RT and the MSC. This complete separation of signaling from the transmission path enables the use of a limited amount of bandwidth between the RT and the MSC/VLR. Thus, such signaling messages can be transmitted over a Wide Area Network (WAN), which itself can be transmitted over a satellite.

The remote terminal preferably includes a traffic channel controller for allocation and release of traffic channels over the satellite, an interworking function for speech coding and for signaling, via, e.g., the TCP/IP, and a Public Switched Telephone Network (PSTN) interface. These main three components function together to provide cost-effective cellular coverage to remote villages.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
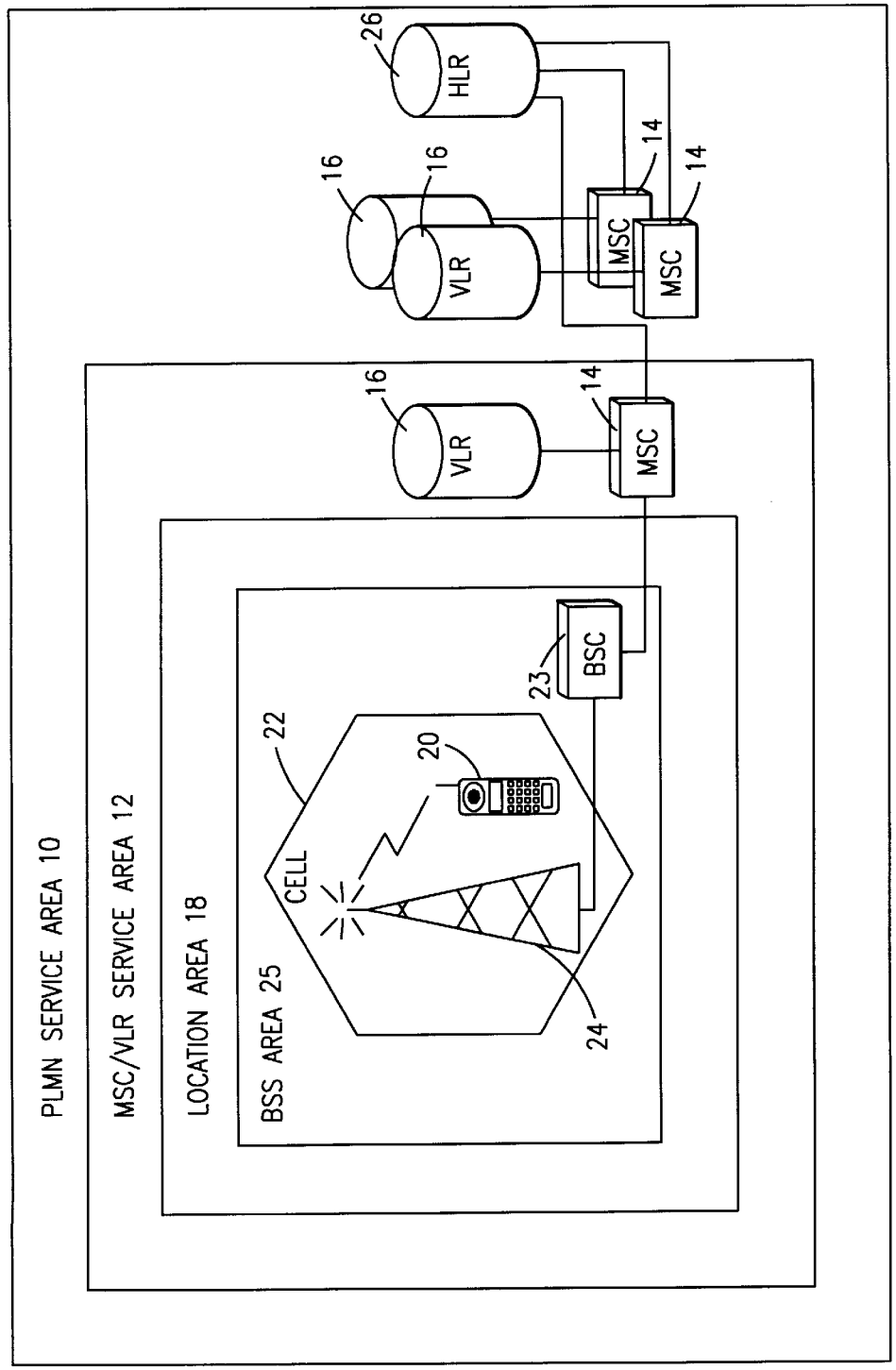
FIG. 1 is a block diagram of a conventional terrestrially-based wireless telecommunications system.
Figure 2:
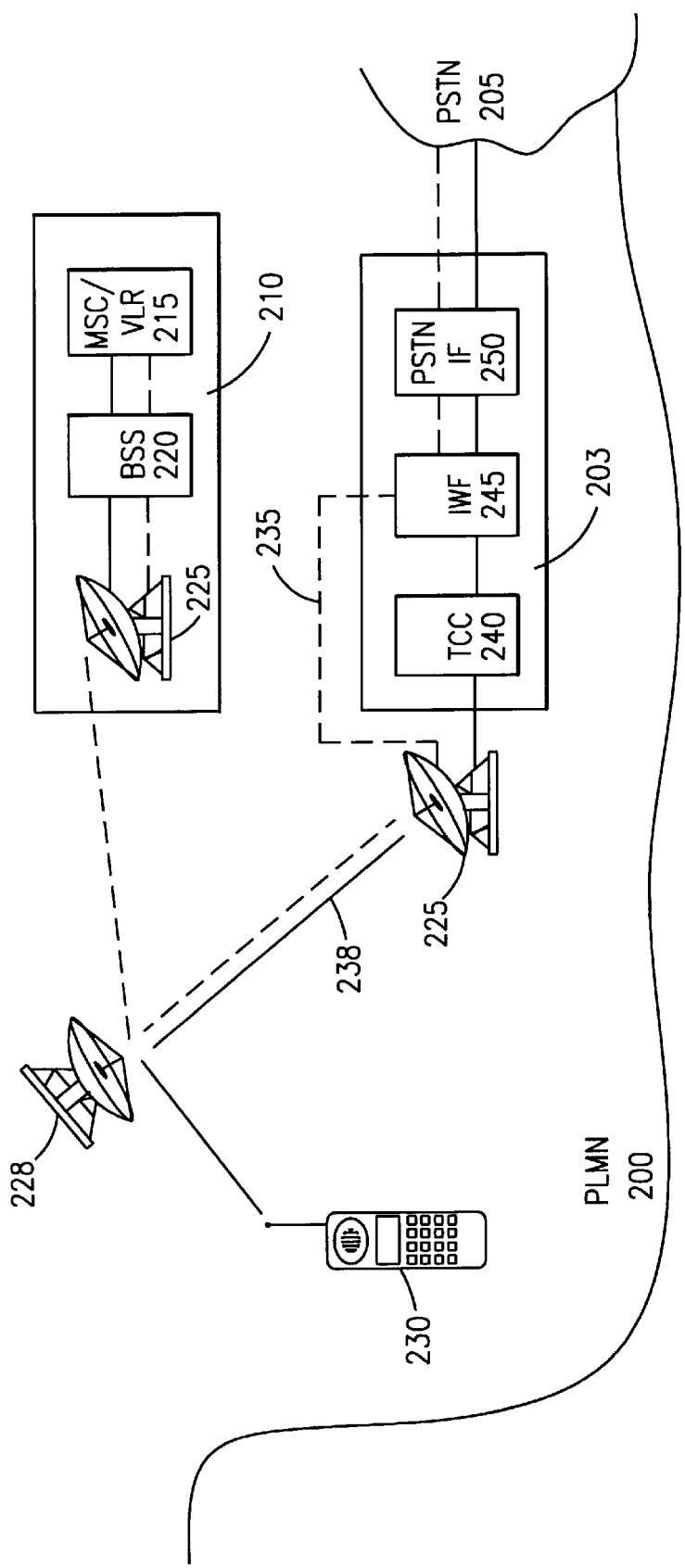
FIG. 2 shows a sample embodiment of the signal tunneling and remote terminal connection system of the present invention.

With reference now to FIG. 2 of the drawings, a system configuration is depicted, which incorporates a "Village Remote" (VR) terminal 203 as part of a PLMN 200. The satellite ground facilities are based on the normal GSM network, as is well known in the art, with adaptations for communicating via satellites 225. The "urban" 210 part of the network, hereinafter referred to as the host node, makes use of a combined Mobile Services Center/Visitor Location Register (MSC/VLR) 215, which is coupled to a Base Station System (BSS) 220. The BSS 220 communicates to mobile stations (MS) 230 within the PLMN 200 through satellites 225. The VR terminal 203 is registered in the host node 210.

However, significant differences exist between the VR 203 architecture and that normally used in cellular radio networks, especially in conjunction with a GSM radio network. For example, as illustrated in FIG. 2, the VR terminal 203 does not possess a "lower layer" transmission connection between itself 203 and the MSC/VLR 215. The only connection between the VR 203 and the MSC/VLR 215 is for signaling, via, for example, the TCP/IP, shown by dotted line 235. The signaling messages 235 are transmitted over a satellite communications link, which includes ground-based satellites receivers 225 and at least one orbiting satellite 228. In addition, not all the control channels normally associated with a BSS 220 are used in the VR 203, e.g., Broadcast Control Channels (BCCHs).

The three main components of the VR 203 include the Traffic Channel Controller (TCC) 240, the Interworking Function (IWF) 245, and the wireline Public Switched Telephone Network (PSTN) Interface/Controller 250. The Traffic Channel Controller (TCC) 240 is responsible for allocation and release of traffic channels, shown as solid line 238, across the satellite communications link 225 and 228. These traffic channels 238 are used for the transfer of user information, whether speech or data, and are allocated after the pertinent signaling messages 235 are sent to the host node 210. The communication path 238 in regards to transmission of speech or data from the MS 230 follows a line from the MS 230, to satellites 225 and 228, and then to the TCC 240, using the forward and reverse satellite air interface links, as is known in the art.

The Interworking Function (IWF) 245 contains functions for interworking on two levels or planes, broadly speaking: the physical or transmission plane, and the signaling plane. These planes can be further subdivided to take into account layering, e.g., for error correction, as is well-known in the art.

The interworking function 245 is responsible, on the transmission plane, for converting speech coding formats between the satellite (225 and 228) format and the PSTN 205 (wireline) format. Typically, the PSTN 205 coding format will be based on 64 kilobit per second coded Pulse Code Modulation (PCM). Pulse Code Modulation (PCM) samples, quantizes, digitally encodes, and transmits the analog speech waveform over the terrestrial interface.

The satellite (225 and 228) coding format can take a number of different forms, since the air-interface must both be highly optimized and produce good sound or voice quality under relatively low link margin conditions. For example, vocoders and hybrid voice coders can be used. However, although vocoders use low bit-rates (1.2 or 2.4 kilobit/s), they typically produce speech that has a synthetic and metallic tone. This makes it difficult to ascertain the speaker's identity, although the actual words are easily understood. Hybrid coders, or "soft" vocoders, on the other hand, are more robust than true vocoders. The hybrid approach is a kind of coding that feeds a carefully optimized excitation signal to a linear predictive filter. Hybrid coders adopt many of the efficiencies of traditional vocoding, while following the subtle properties of the speech waveform. The approach uses high quality waveform coding principles to optimize the excitation signal, instead of using the rigid two-state excitation of vocoding.

On the signaling plane, the IWF 245 must support communication towards the host node 210. This communication can be divided into two related categories: communication for the allocation of radio (satellite) resources and communication for the management of protocols used by the PSTN Interface and Controller 250. Both types of communication are necessary to transmit voice and data and to deliver the signaling information.

As can be seen in FIG. 2, the transmission path 238 for voice and data from the VR terminal 203 goes from the "PSTN" 205 (which may actually be a village Private Branch Exchange (PBX) or something similar) to the VR terminal 203, through the IWF 245 for voice coding conversion, to the TCC 240 for insertion in the traffic channel data stream 238, to the satellites 225 and 228, and then to the Mobile Station 230.

Although the physical path 238 is shown connected to the PSTN controller function 250, this is only intended to indicate the likeliest point of physical connection. The 64 kilobit/s PCM traffic is routed, unmodified, to the IWF 245, where the voice coding/decoding is performed. It should be noted that the transmission path 238 between the MS 230 and the PSTN 205 is bidirectional. It should also be noted that, unlike other cellular systems, the transmission path 238 never enters the MSC/VLR 215 where the subscriber is registered.

The signaling path 235 runs from the PSTN 205 to the PSTN Controller 250 and the IWF 245. Within the IWF 245, the signaling, e.g., control information, is packetized for delivery across the satellite communications link 225 and 228. One form of packetization is Internet Protocol packets, although other forms could be used. These packets are then sent via the satellite communications link (225 and 228) to the host node 210. This tunneling process of encapsulating, e.g., an x.25 packet of signaling messages 235, within a TCP/IP packet, and transmitting the signaling messages 235 over the satellite communications link (225 and 228) to be unpacketized at the host node 210 enables a village remote 203 to allow their subscribers to receive calls from, and place calls to, cellular phones without installing expensive trunklines.

Figure 3:
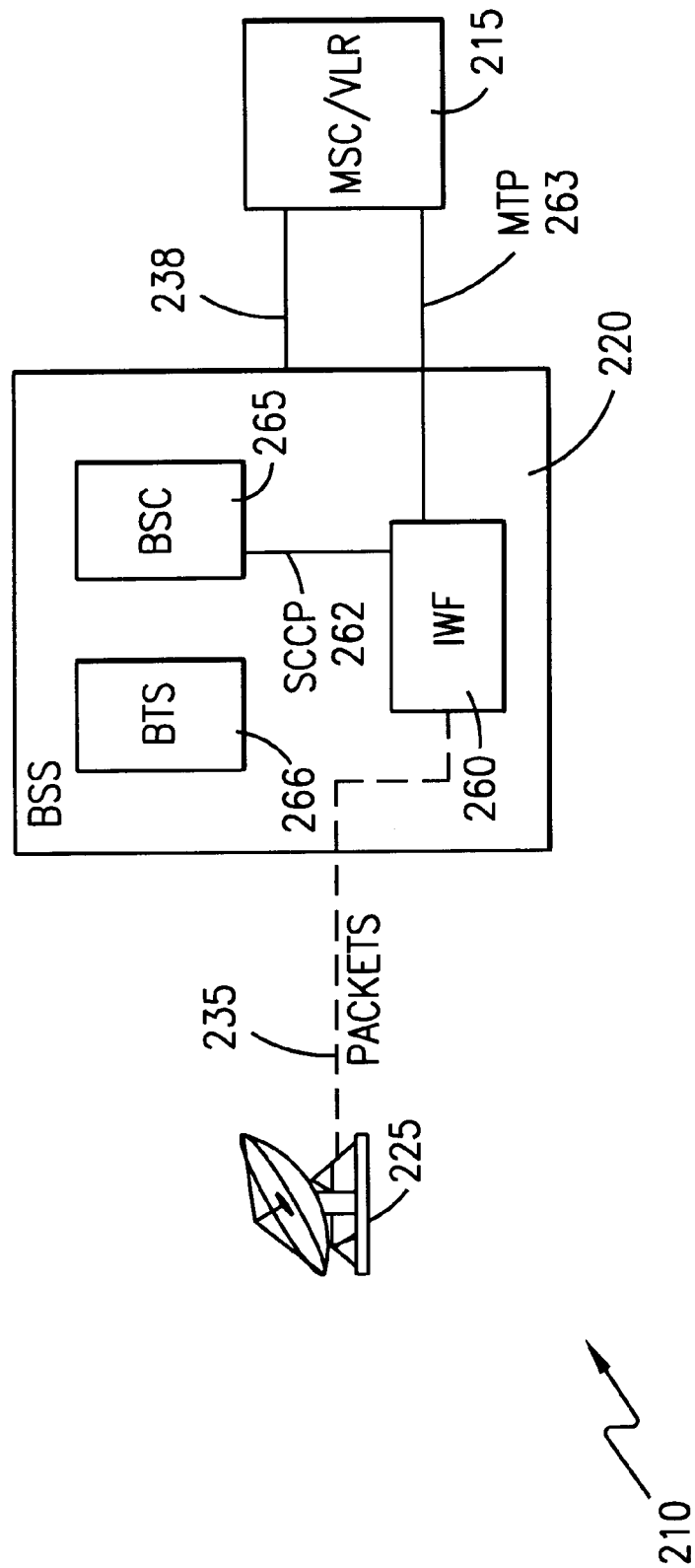
FIG. 3 is a block diagram illustrating the main components of a host network node.

With reference now to FIG. 3 of the drawings, an interworking function 260 on the host end 210 contains a subset of the functions of the IWF 245 on the VR end 203. All that is required of the IWF 260 on the host end 210 is to packetize and unpacketize the messages and send them on the appropriate link, e.g., either Message Transfer Part (MTP) 263 or Signaling Connection Control Part (SCCP) 262.

The MTP 263 is the transport protocol, which allows for the use of any digital-type interface and provides the functions necessary for basic error detection and correction for all signal units. MTP 263 also allows for the determination of to whom a message is addressed, who the user of a message is, and where to immediately route the call. The SCCP is a protocol used for accessing databases and other entities within the network and provides the means for routing a message through the entire network, not just point-to-point routing that the MTP is capable of.

One set of control signals, e.g., for allocating traffic channels, is routed to the BSC function 265 as SCCP messages 262, while the other set, e.g., for establishing the call, is sent to the MSC 215 as MTP messages 263. It should be noted that other combinations could be envisaged, especially for controlling the traffic channel allocations. After a connection has been established, the BTS 266 of the host node 210, receives the encoded speech (e.g. by a vocoder or hybrid voice coder) and maps the encoded speech onto the traffic channels allocated across the satellite communications link 225 and 228.

Figure 4:
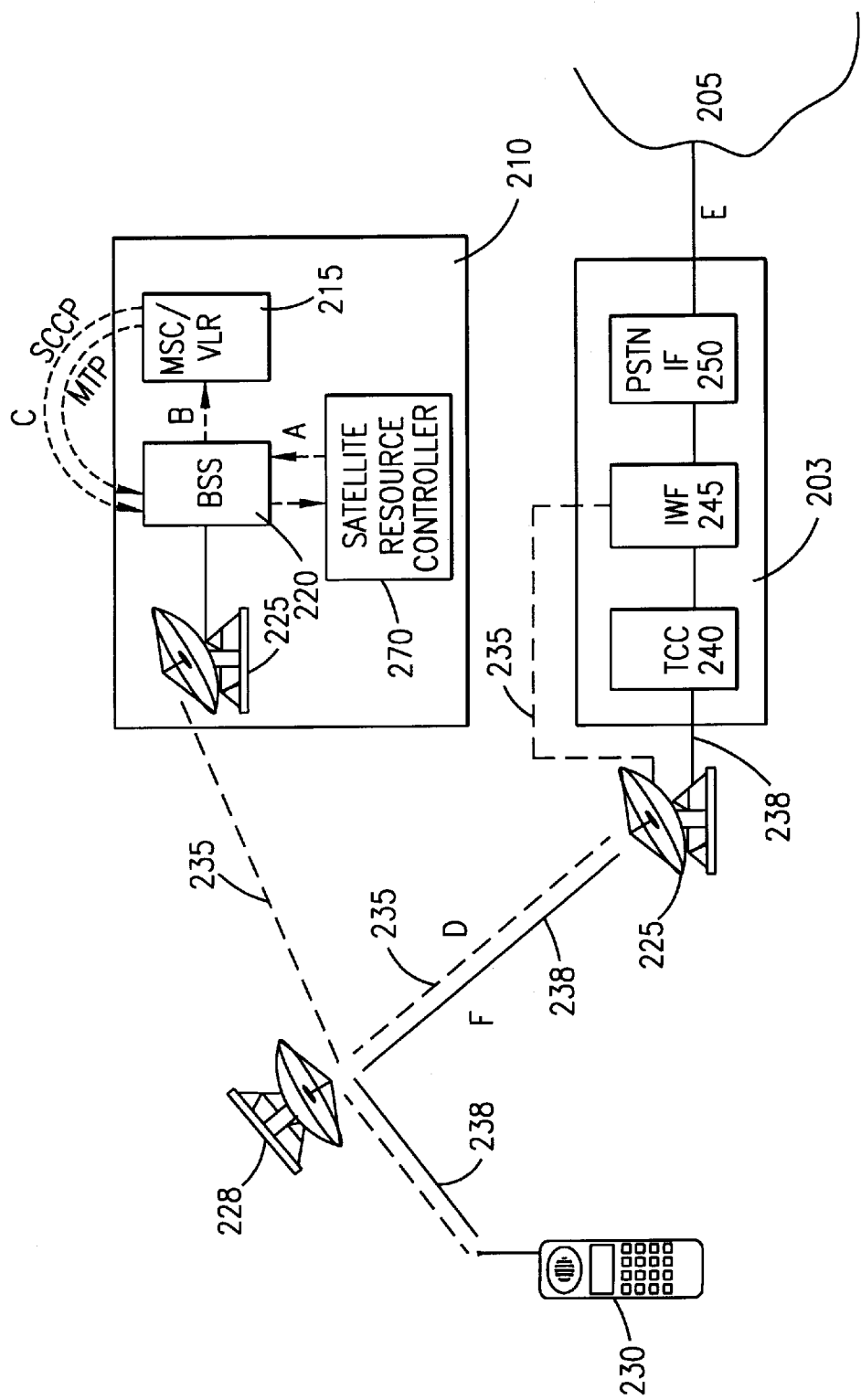
FIG. 4 illustrates one embodiment of a mobile terminated call to a village remote terminal.

A typical mobile-terminated VR scenario is illustrated in FIG. 4. When a mobile subscriber 230 originates a call to the "village remote," designated by reference number 205, the called party digits are forwarded to the host node 210 via the satellite communications link (225 and 228) and analyzed by, for example, a function associated with a satellite resource controller 270. It should be noted, however, that a number of different nodes can perform the digit analyses, e.g., the MSC/VLR 215.

In this example, the satellite resource controller 270 analyzes the digits and determines that the transmission should go through a Village Remote terminal 203 (step A). Thereafter, the satellite resource controller 270 allocates a Traffic Channel, which is accessible by the village remote terminal 203. It can additionally assign a transaction identifier, which is used later on to associate the PSTN 205 part of the call to the satellite traffic channel. The reserved traffic channel and the assigned transaction identifier are then passed back to the BSS 200 for additional processing. Up to this point, only signaling has been going on between the MS 230 and the host network node 210.

The transaction identifier along with the rest of the call setup information is then transmitted to the MSC/VLR 215 (step B), which processes it as it would a normal call (step C). Such processing includes establishing the call on the network side, using MTP signaling, and ordering the necessary channel allocations on the radio access side, using SCCP signaling. The two dotted arrows in step C are intended to show that both the SCCP messages and the MTP messages are actually routed back to the BSS 220.

Normally, this step (step C) results in the MTP messages being sent from the MSC/VLR 215 to the particular PSTN to which it is connected. However, with this invention, the MTP messages will be packetized and routed to the VR terminal 203 (step D) where they are unpacketized. The MTP messages are then used to make the connection from the PSTN controller 250 to the PSTN 205 (step E), while the SCCP messages are used to order the traffic channel connections between the MS 230 and the PSTN 205 (step F).

It is at this point that the transaction identifier is used to make the association between the PSTN 205 connection and the radio traffic channel connection. This typically requires the passing of the transaction identifier in, e.g., the Initial Address Message (IAM), which is the protocol message sent to establish a connection on a voice circuit between two end offices. For example, the transaction identifier could be stored in the Generic Address Parameter or even as a prefix or suffix to the Called Party Number, both of which are located in the IAM.

It should be noted that the sequence of the steps listed in FIG. 4 can be changed, for instance, in the order between the PSTN 205 connection and the traffic channel connection. Furthermore, additional steps can be included and existing steps can be modified.

The case where a subscriber within the PSTN 205 makes a call to a Mobile Station 230 works in a mirror fashion. Briefly, a call entering the network at the village remote 205 will cause, for example, MTP messages to be routed, via the satellite communications link (225 and 228), to the MSC/VLR 215 where the subscriber is registered. The MSC/VLR 215 then informs the BSS 220 of the location of the calling party. The satellite resource controller 270 then allocates a traffic channel and transaction ID, and passes the transaction ID to the MSC/VLR 215. Finally, at channel assignment, the transaction ID is used to make the association between the allocated traffic channel and the PSTN 205 transmission path in the VR 203.

Although various supplementary services will not be able to be provided with the remote terminal system of the present invention, such as multi-party calling, since the actual transmission path does not go through the MSC/VLR 215, cost-efficiency for cellular voice and data calls to remote locations is provided.

As will be recognized by those skilled in the art, the innovative concepts described herein can be modified and varied over a tremendous range of applications, and accordingly the scope of patented subject matter is not limited by any of the specific exemplary teachings given.

What is claimed is:

1. A telecommunications system for providing wireless communication to a remote subscriber of a remote communications system, said telecommunications system comprising:
   a host node comprising a mobile services center having a plurality of mobile terminals in wireless communication therewith through a satellite communications link; and
   a remote terminal system connected to said remote communications system, said remote terminal system further having only a wireless connection to said host node via said satellite communications link, said remote terminal system comprising a traffic channel controller for allocating a traffic channel reserved by said host node for a call connection between a given one of said mobile terminals, and said remote subscriber through said remote terminal system and said satellite communications link, interworking means for transmitting and receiving signaling messages between said remote terminal system and said host node via said satellite communications link to allocate said traffic channel and establish said call connection, and remote network interfacing means for interfacing with said remote communications system to establish said call connection to said remote subscriber.

2. The telecommunications system of claim 1, wherein said remote terminal system is registered in said host node.

3. The telecommunications system of claim 1, wherein said remote network interfacing means consists of a Public Switched Telephone Network interface.

4. The telecommunications system of claim 1, wherein said traffic channel transfers voice and data.

5. The telecommunications system of claim 1, wherein said interworking means converts speech coding formats between the format of said satellite communications link and the format of said repot communications system.

6. The telecommunications system of claim 1, wherein the coding format of said remote communications system uses the 64 kilobit per second Pulse Code Modulation coder.

7. The telecommunications system of claim 1, wherein said signaling messages are packetized as Internet Protocol packets.

8. The telecommunications system of claim 1, wherein said host node further comprises a base station system, said base station system having additional interworking means for packetizing and unpacketizing said signaling messages, and a base station controller for processing said signaling messages.

9. The telecommunications system of claim 8, wherein said signaling messages received by said host node are routed from said additional interworking means to said base station controller as signaling connection control part messages.

10. The telecommunications system of claim 8, wherein said signaling messages received by said host node are routed from said additional interworking means to said mobile services center as message transfer part messages.

11. The telecommunications system of claim 1, further comprising a satellite resource controller connected to analyze digits dialed by said given mobile terminal, indicate said traffic channel to be allocated by said traffic channel controller, and assign a transaction identifier to said given mobile terminal, said transaction identifier being used to associate the connection between said remote network interfacing means and said traffic channel.

12. The telecommunications system of claim 11, wherein said transaction identifier is located in an initial address message.

13. A remote terminal system connected to a remote communications system to connect wireless communication to said remote communications system, said remote terminal system comprising:

a traffic channel controller for allocating a traffic channel reserved by a host node for a call connection between a remote subscriber within said remote communications system, and a given one of a plurality of mobile terminals in wireless communication with said host node via a satellite communications link, said call connection being established through said remote terminal system and said satellite communications link;

interworking means for forwarding signaling messages between said remote terminal system and said host node via said satellite communications link to allocate said traffic channel and establish said call connection, said remote terminal system having only a wireless connection to said host node via said satellite communications link; and remote network interfacing means for interfacing with said remote communications system to establish said call connection to said remote subscriber.

14. The remote terminal system of claim 13, wherein said remote network interfacing means consists of a Public Switched Telephone Network Interface.

15. The remote terminal system of claim 13, wherein said traffic channel transfers voice and data.

16. The remote terminal system of claim 13, wherein said interworking means converts speech coding formats between the format of said satellite communications link and the format of said remote communications system.

17. The remote terminal system of claim 13, wherein the coding format of said remote communications system uses the 64 kilobit per second Pulse Code Modulation coder.

18. The remote terminal system of claim 13, wherein said signaling messages are packetized as Internet Protocol packets.

19. A method for providing wireless communication to a remote subscriber of a remote communications system within a telecommunications system, said telecommunications system comprising a host node having a mobile services center and a plurality of mobile terminals in wireless communication therewith through a satellite communications link, and a remote terminal system connected to said remote communications system and having only a wireless connection to said host node via said satellite communications link, said remote terminal system having a traffic channel controller, interworking means, and remote network interfacing means, said method comprising the steps of:

sending signaling messages, using said interworking means, between said remote terminal system and said host node via said satellite communications link to establish a call connection between a given one of said mobile terminals and said remote subscriber through said remote terminal system and said satellite communications link;

allocating, using said traffic channel controller and said host node, a traffic channel for said call connection; and establishing, using said remote network interfacing means, said call connection between said remote subscriber of said remote communications system and said given mobile terminal.

20. The method of claim 19, wherein said remote terminal system is registered in said host node.

21. The method of claim 19, wherein said remote network interfacing means consists of a Public Switched Telephone Network interface.

22. The method of claim 19, wherein said traffic channel transfers voice and data.

23. The method of claim 19, wherein said interworking means converts speech coding formats between the format of said satellite communications link and the format of said remote communications system.

24. The method of claim 19, wherein the coding format of said remote communications system uses the 64 kilobit per second Pulse Code Modulation coder.

25. The method of claim 19, wherein said signaling messages are packetized as Internet Protocol packets.

26. The method of claim 19, wherein said host node further comprises a base station system, said base station system having additional interworking means for packetizing and unpacketizing said signaling messages, and a base station controller for processing said signaling messages.

27. The method of claim 26, wherein said signaling messages received by said host node are routed from said additional interworking means to said base station controller as signaling connection control part messages.

28. The method of claim 26, wherein said signaling messages received by said host node are routed from said additional interworking means to said mobile services center as message transfer part messages.

29. The method of claim 19, further comprising the steps of:

before said step of allocating, analyzing, by a satellite resource controller, the digits associated with said call;

indicating, by said satellite resource controller, said traffic channel to be allocated by said traffic channel controller; and assigning, by said satellite resource controller, a transaction identifier to said call, said transaction identifier being used to associate the connection between said remote network interfacing means and said traffic channel.

30. The method of claim 29, wherein said transaction identifier is located in an initial address message.

\* \* \* \* \*